United States Patent
Harrington et al.

[15] 3,664,242
[45] May 23, 1972

[54] METHOD FOR MARKING ROADWAYS

[72] Inventors: Thomas L. Harrington, Saint Paul; Jens L. Jorgensen, White Bear Lake, both of Minn.

[73] Assignee: Minnesota Mining and Manufacturing Company, St. Paul, Minn.

[22] Filed: June 15, 1970

[21] Appl. No.: 46,492

Related U.S. Application Data

[63] Continuation-in-part of Ser. No. 647,327, June 20, 1967, abandoned, which is a continuation-in-part of Ser. No. 314,505, Oct. 7, 1963, abandoned.

[52] U.S. Cl............................................94/22, 94/1.5, 117/2, 260/41
[51] Int. Cl................................................................E01c 21/00
[58] Field of Search..................94/22, 1.5; 260/37, 41; 117/2

[56] References Cited

UNITED STATES PATENTS

| 3,036,928 | 5/1962 | Poole | 94/1.5 X |
| 3,279,336 | 10/1966 | Eaton | 94/44 |
| 3,410,185 | 11/1968 | Harrington | 94/22 |

*Primary Examiner*—Jacob L. Nackenoff
*Attorney*—Kinney, Alexander, Sell, Steldt & Delahunt

[57] ABSTRACT

A method for forming traffic-control markings on roadways using a novel particulate marking material. The marking material is heated and projected to the roadway, and the resulting markings are ready to bear wheeled road traffic within seconds. The marking material comprises a particulate thermoplastic-resin-based composition having an organic phase that melts to a low-viscosity condition and principally comprises a polyamide resin. It also preferably includes an inert particulate material, preferably transparent glass beads, that is non-melting at the temperature of application of the marking material.

7 Claims, No Drawings

METHOD FOR MARKING ROADWAYS

RELATED APPLICATIONS

This application is a continuation-in-part of application, Ser. No. 647,327, filed June 20, 1967, which was in turn a continuation-in-part of application, Ser. No. 314,505, filed Oct. 7, 1963; both applications are now abandoned.

The traffic-control markings formed on roadways from prior-art marking materials and by prior-art methods usually require at least a few minutes or more after application before they are ready to bear wheeled road traffic without being marked or having marking material transferred to adjacent portions of the roadway. As a consequence, traffic on a roadway being marked with prior-art marking materials and method is normally diverted from at least the specific area being marked, as by placing traffic cones along a stripe just applied, or closing off part of the roadway with traffic cones, barricades, or flag-men. This diversion is quite undesirable—it inconveniences traffic, increases the cost of the marking operation, and creates risks to both the marking crew and to traffic on the roadway, and efforts have long been made to provide traffic-control markings on roadways that are ready to bear traffic within seconds after application.

Some prior art marking materials and methods suffer other disadvantages beside slowness of drying. For example, in an effort to form fast-drying markings, thermoplastic marking materials have been heated in an applicator to a molten condition and then extruded onto the roadway as a single mass. These materials and methods not only did not provide the short drying time desired, but the marking materials also have a tendency to clog application machinery, and the method is otherwise a difficult one.

The present invention provides a marking material and method that avoid the above problems associated with prior-art methods and marking materials and do so by virtue of the fact that, among other things, the marking material is in particulate form. Further, the marking material has the proper balance of properties to give wear-resistant tack-free markings that are well-adhered to a paved roadway surface. The method used to apply the marking material is generally the procedure described in U.S. Pat. No. 3,410,185, in which marking material is projected to the roadway while being heated to an elevated temperature. When the material strikes the roadway, it forms a substantially continuous film, which then rapidly cools to traffic-bearing condition. Markings formed from the marking material of this invention are generally ready to bear traffic within 30 or 40 seconds after application in temperate climate regions; thus a crosswalk stripe can be formed within about the time required for a semaphore signal change.

The particulate marking material of the invention generally comprises, first, a particulate thermoplastic-resin-based composition that is in a limited range of rather fine particle sizes and softens and flows during the described marking operation to provide a substantially continuous film matrix. Secondly, an inert particulate material that is non-melting at the predetermined elevated temperature at which the marking material is applied to the roadway is preferably mixed into the particulate thermoplastic-resin-based composition. This inert non-melting particulate material is incorporated for a variety of functions—to serve as wear elements, to somewhat roughen the surface of the applied line so that it will not be excessively slippery, to control the flow of the marking material when applied to the roadway, etc. Preferably, the inert non-melting particulate material includes or wholly consists of transparent glass beads, which also contribute reflex-reflectivity to the applied line.

As indicated, the particulate thermoplastic-resin-based composition is in a narrow range of rather fine particle sizes, which causes the marking material to function as desired during the described application procedure; more specifically, it passes a screen of about 20 mesh (U.S. Standard), but at least about 80 weight-percent of it is retained on a screen of about 200 mesh. It is non-tacky, non-blocking, free-flowing, and solid under such conditions as it normally experiences prior to application (temperatures up to about 120° F.). It comprises organic ingredients that account for at least about 25 volume-percent, and preferably at least 50 volume-percent, of the whole marking material, and a coloring agent in an amount sufficient to color a marking formed from the marking material.

The organic ingredients, or organic phase, of this particulate thermoplastic-resin-based composition quickly melts to a low-viscosity condition when heated, so that the marking material flows sufficiently to wet the paved roadway surface and coalesce as a continuous film. But after being reduced in temperature to about 75° F., the organic phase achieves a solid non-tacky condition within seconds up to one minute. Generally, the melt-viscosity of the organic phase should be less than 4,000 centipoises at 300° F. and less than 15,000 centipoises at 250° F.; preferably it is less than 3,000 centipoises and 10,000 centipoises at 300° F. and 250° F., respectively. The principal ingredient of the organic phase (generally accounting for at least about 50 weight-percent of the organic phase) is a polyamide resin formed by condensation of polycarboxylic acid and polyamine, such as the reaction product of polymerized fatty acid and aliphatic polyamine. The polyamide resin has a sharp melting point within the range of 150° to 300° F. as determined by the capillary-tube method, and a melt-viscosity at 300° F. of less than 10,000 centipoises; preferably its melt-viscosity is less than 5,000 centipoises at 300° F.

To assure the necessary viscosity requirements for the organic phase, the organic phase preferably includes in addition to the polyamide resin a low-molecular-weight material (below about 500 in molecular weight, for example) that has a sharp melting point within the range of 150° to 300° F. according to the capillary-tube method, exhibits a melt-viscosity of less than 100 centipoises at 300° F. (preferably less than 50 centipoises at 300° F.), and is a solvent for the polyamide resin—that is, is compatible and miscible with the polyamide resin so as to reduce the viscosity of the organic phase. When included, the amount of the low-molecular-weight material is generally between 1 and 25 weight-percent of the total weight of the organic phase of the particulate to provide the desired viscosity-reduction without unduly lengthening the open-tack time of an applied line or causing the applied line to become tacky at ambient temperatures it experiences.

Viscosities herein are all Brookfield viscosities taken with a No. 2 spindle with the revolutions per minute appropriate to the viscosity being determined. Sharp melting point according to the capillary-tube method refers to a temperature range of no more than about 15° F., usually no more than 10° F., between initial tendency of crumbs of material in a capillary tube to become transparent and the temperature at which they become fully transparent.

The organic phase of the marking material of the invention will be further illustrated by the following representative examples:

EXAMPLE I

| | Parts by weight |
|---|---|
| Plasticized polyamide, melting at 183°–201° F. by capillary-tube method ("Versamid 950") | 43.75 |
| Polyamide melting at 252°–260° F. by capillary-tube method ("Versamid 725") | 43.75 |
| Ketone resin ("Mohawk MR–60") | 12.5 |
| Chlorinated naphthalene ("Halowax 1001") | 5.0 |

The foregoing ingredients were blended together by melting and stirring them at approximately 250° F. for about one-half hour. The viscosity of the completed blend was measured at various temperatures and found to be 460 centipoises at 300° F.; about 1,500 centipoises at 250° F.; and about 10,000 centipoises at 210° F. On cooling to about 75° F, the melted blend essentially lost tack immediately. Reheating of the blend to 150° F. did not develop tackiness, but heating to 155° F. did.

The polyamides of both polyamide components in the above formula are condensation reaction products of polymerized aliphatic fatty acids (to dimers and possibly some trimers which generally arise) and aliphatic polyamines, such as disclosed and claimed in U.S. Pat. No. 2,379,413. Depending on the specific fatty acid and polyamine selected, as well as the extent of reaction and termination groups, melting point as well as melt-viscosity at elevated temperatures may be varied. These polyamides are rather low in molecular weight. The toughness of films formed according to the invention is particularly surprising in view of the fact that toughness is ordinarily not associated with organic materials of such low molecular weight (usually less than 5,000 or 6,000 but more than 1,000 for the polyamides) as are preferably used in the marking material of the invention.

The plasticized polyamide ("Versamid 950") in the above formula is itself a blend which melts according to the ball-and-ring method at about 196° F., and according to the capillary-tube method from 183° to 201° F. It exhibits a viscosity at 300° F. of about 825 centipoises and at 250° F. of about 3,000 centipoises. It is an intimate blend of about 5–15 weight-percent of a mixture of ortho- and para-N-ethyl-toluenesulfonamide ("Santocizer 8"), which acts as a low-molecular-weight plasticizer (but is not waxy or wax-like), and a polyamide condensation product. The latter is prepared by reacting about 295 weight-parts of dimerized fatty acid of linseed oil, about 18 parts of monomeric fatty acid, and about 32 parts of ethylene diamine at about 200° – 300° C until approximately the theoretical amount of water generated on condensation is obtained. The resulting condensation product has a molecular weight of about 3,000, an amine value of about 4, a relatively sharp melting point according to the capillary-tube method from 220° to 226° F., and a viscosity at 300° F. of about 1,300 centipoises, and at 250° F. of about 8,000 centipoises.

The unmodified polyamide ("Versamid 725") in the formula has a melting point of about 250° F. according to the ball-and-ring method and from 252° to 260° F. according to the capillary-tube method. Its viscosity at 300° F. is about 350 centipoises and at 250° F. about 22,000 centipoises. It likewise is a condensation reaction product of polymerized (to dimers, possibly with some trimers) fatty acid with aliphatic polyamines. Interpretation of its infra-red absorption curve indicates it to have many of the characteristics of a polyamide formed by reaction of a dimerized (i.e. polycarboxylic) drying oil acid with an alkylene diamine such as ethylene diamine; it likely also has a low-molecular-weight aliphatic dicarboxylic acid such as sebacic or maleic acid on its terminals. Its molecular weight is about 2,100 and amine value is 4.

The ketone resin in the formula is a condensation product of formaldehyde with cyclohexanone having a molecular weight of approximately 500 and a melting point of about 164° F. according to the ball-and-ring method and 133°–153° F. according to the capillary-tube method. As 300° F. is approached, it tends to foam when heated alone. In the composition it desirably serves to lower the viscosity of the organic phase on melting. Surprisingly, it shortens the open-tack time of the composition when the composition is cooled from a melt to about 75° F.;but it lowers the temperature at which tack is imparted to the composition on heating from about 75° F. upwards. Such behavior is considered rather anomalous. Up to about 40 weight-percent of the organic phase may consist of a fluidizing solid organic resin such as this ketone resin having a molecular weight below 1,000, or possibly 1,500, and yet having a viscosity at 250° F. up to 10,000 centipoises and at 300° F. up to 5,000 centipoises.

The chlorinated naphthalene in the composition is a mixture of tri- and tetrachloronaphthalenes. It is a white crystalline wax-like solid with about 50 percent chlorine content. It molecular weight is approximately 255, and its melting point is approximately 200° F. according to the ball-and-ring method. It melts to a very mobile liquid that has a very flat viscosity characteristic. Below melting it is solid, crystalline and waxy; but once it melts it immediately becomes very watery. Further, it has a very high boiling point of well above 550° F., and does not decompose at temperatures up to or during boiling. In the composition described herein, it serves upon melting as a solvent for the bulk of the organic polymeric resinous material in the composition, and it lowers the viscosity of the melt. It also lowers the temperature at which tackiness is imparted to the composition when the composition is elevated from room temperature, but surprisingly it does not significantly change the open-tack time of the composition when the latter is cooled from a melt to about 75° F.

An interesting relationship between the melt-viscosities of the individual ingredients described above and of the melt-viscosities of the ingredients in combination is shown in the following table:

| Component | Viscosity at 300° F. (cps) | Viscosity at 250° F. (cps) |
|---|---|---|
| "Versamid 950" | 825 | 3,000 |
| "Versamid 725" | 350 | 22,000 |
| Ketone resin | — | 5,900 |
| Chlorinated naphthalene | 4 | 8 |
| Entire organic phase | 461 | 1,800 |

As will be seen, the low-molecular-weight, low-viscosity chlorinated naphthalene greatly reduces the melt-viscosity of the entire organic phase. As an illustration of a useful particulate marking material of the invention that does not include such a low-molecular-weight, low-melt-viscosity material, satisfactory marking materials have been prepared that incorporated only "Versamid 950," described above, as the organic ingredient. For example, a particulate marking material comprising a mixture of a) particles of a blend of 3 weight-parts titanium dioxide and 7 parts "Versamid 950," and b) transparent glass beads, the beads comprising about 15 volume-percent of the whole material, is useful according to this invention.

EXAMPLE II

| | Parts by weight |
|---|---|
| Polyamide melting at 221°–239° F. by ball-and-ring method ("Versamid 930") | 78.0 |
| Polyamide melting at approximately 204° F. by the Duran mercury method ("Sunkem 526G") | 20.0 |
| Hydrogenated tallow amide ("Armid HT") | 2.0 |

The foregoing ingredients were blended together by merely melting and stirring the same at approximately 275° F. for about 1 hour. On cooling from 275° to 75° F., this composition essentially lost tack immediately.

The polyamides in this formula belong to the class of materials described in Example I.

The hydrogenated tallow amide in the formula ("Armid HT") has a melting point (ASTM D87–42) of 208°–217.5° F. Its composition is approximately 75 percent stearamide, 22 percent palmitamide and 3 percent oleamide. Below its melting point it is a fairly hard wax-like crystalline material. In the composition described above, it serves as a solvent for the polyamides, lowering the melt-viscosity of the whole organic phase and improving wetting of the substrate.

The melt-viscosities of the individual components and the whole organic phase are:

| Component | Viscosity at 300° F. (cps) | Viscosity at 250° F. (cps) |
|---|---|---|
| "Versamid 930" | 5,000 | 25,000 |
| "Sunkem 526G" | 3,000 | 13,600 |
| "Armid HT" | 4.5 | 6 |
| Entire organic phase | 2,520 | 9,600 |

EXAMPLE III

| | Parts by weight |
|---|---|
| Polyamide melting at 252°–260° F. by capillary-tube method ("Versamid 725") | 35.4 |
| Plasticized polyamide melting at 183°–201° F. by capillary-tube method ("Versamid 950") | 35.4 |
| Ketone resin ("Mohawk MR 60") | 10.6 |
| Chlorinated paraffin ("Halowax 1001") | 3.6 |
| High-molecular-weight polyamide having a melting point by the ball-and-ring method of 320°–338° F. ("Versalon XR 1165") | 15.0 |

The high-molecular-weight polyamide of the formula is from that class of polyamide materials described in Example I and has a ball-and-ring melting point of 320°–338° F. Its melt-viscosity at 374° F. is 2,500–6,500 centipoises and at 437° F. is 1,000–2,000 centipoises. The other ingredients have been described above.

Blending of the composition was accomplished at about 350°–400° F in about an hour. The completed blend exhibited a melt-viscosity at 300° F. of 1,920 centipoises and at 250° F. of 4,200 centipoises. On cooling to about 75° F. it lost tack immediately.

Turning to the coloring agent included in the particulate thermoplastic-resin-based composition of the invention, the most common is a hiding-type coloring pigment (usually minus 325 mesh but in any event no agglomerates larger than 20 mesh) such as, for example, chrome yellow (zinc, barium, or lead chromate) or titanium dioxide. (White traffic-control markings have been formed by using organic phases as described above with approximately 10 parts by volume of titanium dioxide pigment to every 90 parts by volume of the organic phase.) Yellow and white are the most common colors since those colors are conventionally used for traffic-control markings. If desired, organometallic or organic coloring agents may be used, either alone or in combination with other pigment materials. The amount of coloring agent needed varies with the kind of coloring agent as well as with the other ingredients. Almost always, the coloring agent will comprise at least 1 or 2 volume-percent of the whole marking material, and may comprise as much as approximately 60 volume-percent of the whole marking material; usually, it comprises at least 10 volume-percent of the whole marking material. Preferably the amount of pigment is maintained below limits that would convert the melted mixture of pigment and organic material into a viscous mass at 300° F. exhibiting a viscosity in Krebs units above about 100. The pigments may be admixed as separate discrete entities within the particulate marking material of the invention, but preferably at least part of the pigment is incorporated within the particles of the thermoplastic-resin-based composition so as to enhance the retention of pigment as the marking material is sprayed upon a roadway surface.

As previously noted the particulate thermoplastic-resin-based composition should be within a certain size range if the marking material is to soften and coalesce as desired, avoid burning or charring, be conveniently handled and sprayed, and otherwise function as desired. Generally the particles should pass a screen of about 20 mesh (U.S. Standard) while at least about 80 weight-percent are retained upon a screen of about 200 mesh. Preferably, the particles pass a screen of about 40 mesh and at least 80 weight-percent are retained on a screen of about 100-mesh. Conventional grinding techniques, including cooling the material prior to grinding, are suitable to fabricate marking material of the invention. Preferably the organic constituents and pigments are intimately blended together prior to grinding so as to thereby form individual particles which each contain the necessary ingredients for optimum performance in use. After grinding, the material is screened to the requisite particle size.

The inert non-melting particulate material should be within approximately the same size range as the particulate thermoplastic-resin-based composition. For example, the diameter of the transparent glass beads that are preferably included in marking material of the invention vary within the range from 3 to 30 mils (about 230 to 20 mesh). Surprisingly, a marking applied with marking material of the invention that contains transparent glass beads gives an unusual action in which many of the glass beads are only partially embedded and are immediately ready to serve, in combination with their bond interface in the pigmented diffuse-reflecting film, as reflex-reflectors. The refractive index of the glass beads should be above 1.4, and in special applications may be as high as 2.0, or higher. Any significant amount of glass beads (such as one or two volume-percent of the whole marking material) will provide some reflection, but the best reflection is obtained when the volume of glass beads lies within the range of about 15 to 50 volume-percent of the whole marking material.

As noted above, application of the novel marking material according to this invention involves heating the roadway surface and the marking material as it is projected to the roadway surface sufficiently that the marking material flows, coalesces, and wets the roadway to form a substantially continuous marking that is well-adhered to the roadway. As described in U.S. Pat. No. 3,410,185, the method, in more detail, includes as a first step momentarily preheating the pavement surface of the roadway to a temperature between 150° and 500° F. Next, the particulate marking material is projected toward the thus-heated roadway surface as a stream of individual particles, and is simultaneously heated to a temperature above 150° F. sufficient to at least soften a major portion of the organic phase of the particulate before the particulate reaches the roadway surface. The heated condition of the roadway surface and the particulate marking material is such that the particulate thermoplastic-resin-based composition wets and bonds rapidly to the surface of the roadway and coalesces into a film, which, as noted above, rapidly becomes solid, nontacky and capable of bearing wheeled road traffic without tracking. The applied marking may be momentarily heated after application to generally the same temperatures as described above, as by radiant or flame heat, to improve the unification of the projected particulate, but such a post-heating is typically not essential.

If desired, a coolant material (for example, water, air, or even solid materials such as glass beads or sand at ambient, or lower, temperatures) may be applied over a freshly laid marking to accelerate solidification and detackification. Usually, however, the heat dissipates into the roadway and surrounding areas rapidly enough to solidify and detackify an applied film-marking for road traffic within a few seconds, especially under ambient air-temperature conditions below about 80° F.

A form of apparatus suitable for practicing the method of this invention is described in U.S. Pat. No. 3,279,336. The key parts of suitable apparatus are a burner for heating a roadway surface, a particulate spray conduit for application of particulate to the roadway (in a current of air or similar gas, even fuel for burner flames), and means (such as exposure to flames) to heat the particulate on its way to the roadway. The apparatus causes initial softening and even melting of the organic phase of the particulate while it is on its way to the roadway.

What is claimed is:

1. A method for forming a marking on a roadway that is ready to bear wheeled road traffic within seconds after application comprising:

A. momentarily heating the surface of the roadway to a temperature between 150° and 500° F.;
B. projecting toward the thus-heated roadway a marking material that comprises a continuous stream of solid individual particles that
  1. are capable of passing a screen of about 20 mesh, with at least about 80 weight-percent being retained on a screen of about 200 mesh;
  2. are non-tacky, non-blocking, free-flowing, and solid at temperatures up to about 120° F; and
  3. comprise a) a coloring agent in an amount sufficient to color a marking formed from the marking material and b) an organic thermoplastic phase that i) accounts on the average for at least about 25 volume-percent of the marking material and ii) principally comprises a polyamide condensation product of polycarboxylic acid and polyamine; and
C. heating the individual particles as they proceed toward the roadway to a temperature above 150° F. sufficient to at least soften a major portion of the organic thermoplastic phase of the particles before they reach the pavement, the heated condition of the roadway and the particles being such that the particles wet and bond rapidly to the surface of the pavement and coalesce into a film, which subsequently becomes solid, non-tacky, and capable of bearing wheeled road traffic without tracking.

2. A method of claim 1 in which the marking material further includes an inert particulate material that is non-melting at the application temperature, is approximately within the size range described in B(1) of claim 1 for said particles, and is included in a significant amount up to about 50 volume-percent of the marking material.

3. A method of claim 2 in which the inert particulate material is transparent glass beads.

4. A method of claim 1 in which the organic phase of the particles exhibits a viscosity below 4,000 centipoises at 300° F. and below 15,000 centipoises at 250° F.

5. A method of claim 1 in which the organic phase of said particles further includes a solid organic low-molecular-weight material in an amount comprising between 1 and 25 weight-percent of the organic phase, said low-molecular-weight material having a sharp melting point within the range of 150° to 300° F., exhibiting a melt viscosity of less than 100 centipoises at 300° F., and being a solvent for the polyamide condensation product when melted.

6. A method of claim 1 in which said particles are capable of passing a screen of about 40 mesh.

7. A method of claim 6 in which at least 80 weight-percent of said particles are retained on a screen of about 100 mesh.

* * * * *